Figure 1:
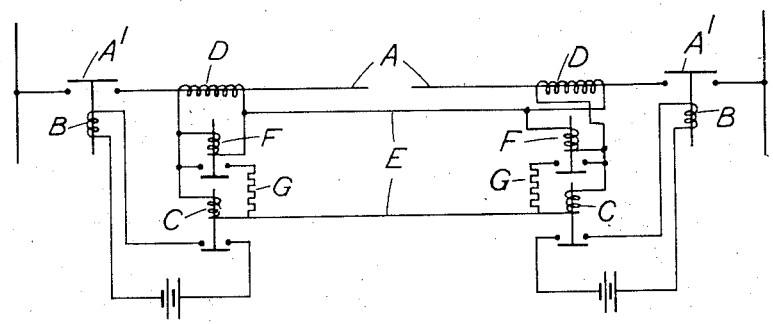

April 8, 1924.

R. W. BILES 1,489,517

PROTECTIVE SYSTEM FOR ELECTRIC CONDUCTORS

Filed March 27, 1923    3 Sheets-Sheet 1

INVENTOR
Reginald W. Biles,
BY Watson, Coit, Morse & Grindle
ATTYS.

April 8, 1924.

R. W. BILES 1,489,517

PROTECTIVE SYSTEM FOR ELECTRIC CONDUCTORS

Filed March 27, 1923   3 Sheets-Sheet 2

April 8, 1924.
R. W. BILES
1,489,517
PROTECTIVE SYSTEM FOR ELECTRIC CONDUCTORS
Filed March 27, 1923    3 Sheets-Sheet 3
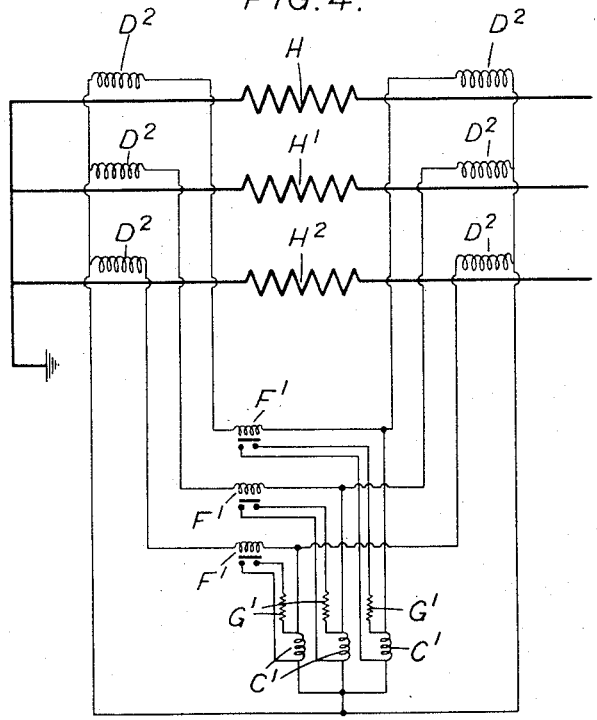

Patented Apr. 8, 1924.

1,489,517

UNITED STATES PATENT OFFICE.

REGINALD WILLIAM BILES, OF BALCOMBE, ENGLAND.

PROTECTIVE SYSTEM FOR ELECTRIC CONDUCTORS.

Application filed March 27, 1923. Serial No. 628,128.

*To all whom it may concern:*

Be it known that I, REGINALD WILLIAM BILES, a subject of the King of England, and residing at Balcombe, Sussex, England, have invented certain new and useful Improvements in Protective Systems for Electric Conductors, of which the following is a specification.

This invention relates to protective systems for electric conductors and has special reference to systems of the Merz-Price type where the operation of trip coils or circuit-breaking devices is brought about when the balance of voltage or current in a pilot circuit is disturbed. The trip coils are often operated by relays, but are sometimes directly in circuit with the transformers.

It is well known that if the setting of the relays or trip coils is sensitive, as it should be for the protection to be operative with small faults to earth or between phases, difficulties arise because the transformers at the ends of the protected conductor or section, though giving a condition of balance with normal current do not give the same degree of balance with heavy straight-through currents, such for instance as the protected conductor may be called upon to carry through a fault or short circuit in an adjacent section.

To remedy this many suggestions have been made such for instance as the employment of what are known as biased relays. These, however, generally tend to lessen the sensitiveness of the relays to a greater or less extent whatever may be the conditions under which they are working.

Again, in a modification of the Merz-Price system wherein the relay is sensitive to faults to earth and relatively insensitive to faults between phases, it has been proposed to employ a device, such as an additional transformer, inductively connected to the feeder circuit and acting through some suitable mechanism to prevent the operation of the relay from having its normal effect of short-circuiting the trip coil circuit on the flow of excessive current such as might result in the event of simultaneous faults to earth occurring in different phases of different sections of the protected system. In such an arrangement the relay itself is thus allowed to act but the consequences of its action are prevented.

In a protective system according to the present invention what may be termed a diverter coil or relay is employed acting on the passage of a heavy straight-through current above a predetermined value, to decrease the sensitiveness of the trip coil or operating relay as for instance by shunting it, by introducing resistance in series with it, or by cutting out one coil in the trip coil or operating relay and switching in another, but at other times leaving such sensitiveness unimpaired.

For the sake of clearness, in the following description, the invention is referred to as applied to an arrangement in which the trip mechanism is operated by a relay but it will be understood that it may also be applied to systems using direct transformer tripping.

The alteration in the sensitiveness of the operating relay is only produced when the condition of the circuit renders it desirable and thus at other times the sensitiveness of the relay is not diminished and in fact may be much greater than would be practicable in the absence of the diverter relay. Moreover the operating relay is not put out of action by the diverter relay but merely has its sensitiveness temporarily decreased.

The diverter relay preferably has a shorter time-operating value than the operating relay for with heavy straight-through currents it is essential that the diverting effect shall take place before the operating relay responds to the out-of-balance condition. On the other hand, the diverter relay will not respond to currents due to small faults to earth or otherwise in the protected section since it operates only on a comparatively heavy current from one of the current transformers and to such faults the sensitive operating relay responds since it is designed to operate on the small difference of current existing between the current transformers. Further on the occurrence of a heavy fault between phases in the protected system, the large out-of-balance produced causes the current in the operating relay to rise to its operating value very quickly so that in that case also the operating relay responds before its sensitiveness has been decreased by the action of the diverter relay.

It is well known that with abnormally heavy straight-through currents the capacity current is sometimes sufficient to operate the relays and this fact often necessitates a higher or less sensitive setting of the relays to avoid such operation. A further advantage of the diverter relay according to this invention is that if it is set to operate at a lower straight-through current value than that which would cause the operation of the relays by capacity current, there will be no danger of such operation and consequently a very low setting or high degree of sensitiveness may be employed for the operating relays.

When the improved protective arrangement according to this invention is applied to a three-phase system, the general connections of transformers, pilot conductors and relays usual in a Merz-Price arrangement may be employed with the addition of the diverter relays working in conjunction with the operating relays in each phase. The diverter relays may be connected across the current transformers of their own phase or, as is preferable in some instances, the diverter relay operating on the ordinary or sensitive relay in one phase may be joined across the current transformer of an adjacent phase. This arrangement has certain advantages particularly when the protective system is applied to two sections of a three-phase system where there is a power transformer between the sections.

It has been proposed in a protective arrangement for a three-phase four-conductor system in which one phase is split into two parallel conductors, to thread the split conductors through balancing transformers at both ends of the line and to employ additional balancing transformers threaded by split conductors in conjunction with unsplit conductors and so arranged as to disturb the normal balance in the main balancing transformers in case of a fault between phases or a fault to earth, the out-of-balance causing the operation of a circuit-breaking relay in the secondary circuit of each of the main balancing transformers. To such an arrangement the diverter relays according to this invention may be applied with advantage acting substantially in the manner before described to decrease the sensitiveness of the relays when by the occurrence of heavy straight-through currents there would otherwise be a risk of the relays being operated unnecessarily.

The improved arrangement may also be applied to protective systems for generators or transformers in which case the general arrangement may be for example that of the Merz-Price balancing current system with the diverter relays added in cooperation with the operating relays.

In the accompanying drawings,

Figure 1 is a diagram showing a protective system with a diverter coil or relay according to this invention applied by way of example to a single conductor.

Figure 5:
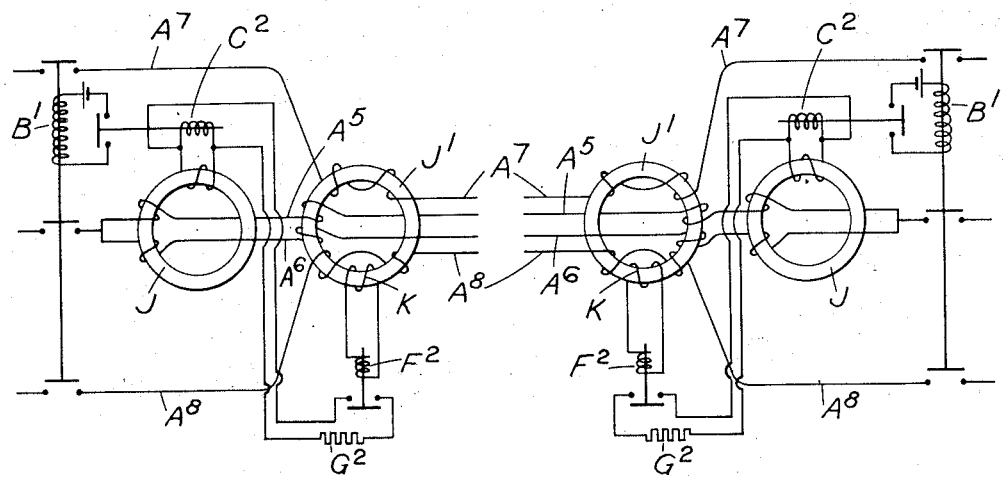
Figure 2:
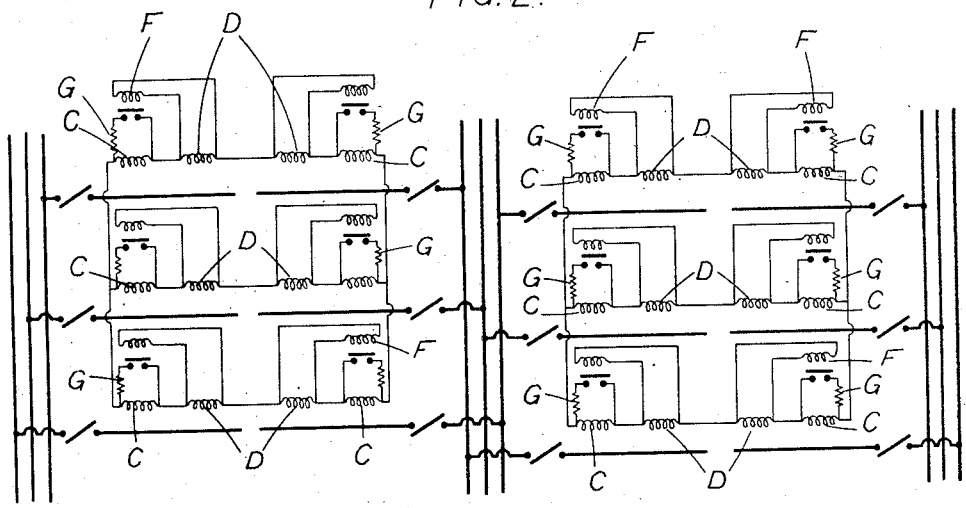
Figure 3:
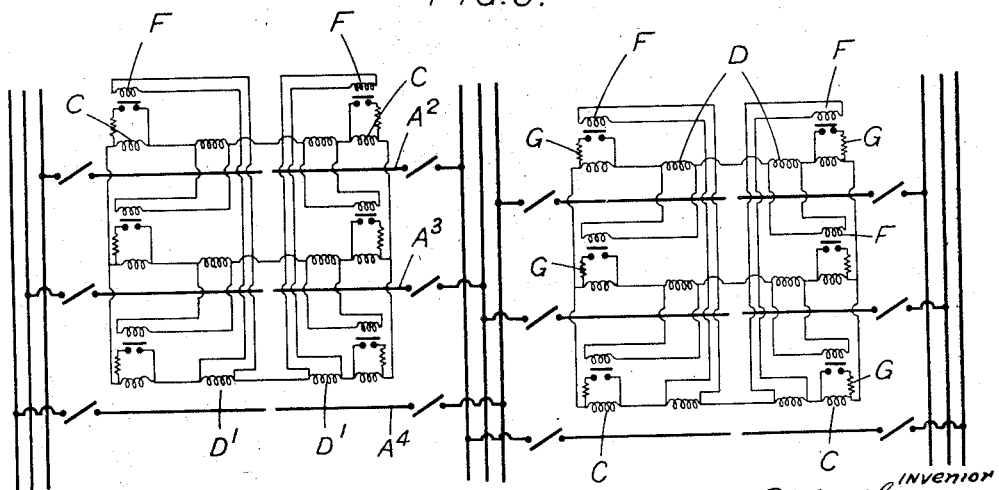

Figure 2 shows a similar arrangement applied to two sections of a three-phase feeder, Figure 3 illustrates an arrangement similar to that shown in Figure 2 but with the diverter coils or relays connected in a different manner, Figure 4 illustrates the invention as applied by way of example to a generator, and Figure 5 illustrates how the invention may be applied to a known three-phase four-conductor system.

With reference first to Figure 1, A is a section of a conductor controlled by switches or circuit breakers A' at each end. These switches are arranged in a well known way so as to be opened by trip coils B when the circuits containing those coils are closed by the operation of sensitive relays C in circuit with the secondaries D of current transformers in a pilot circuit E. The arrangement thus described is well known as previously explained and for normal currents in the conductor A there would be a balance of E. M. F.'s in the pilot circuit and the relays C would not be energized. Heavy straight-through currents caused for example by a fault in an adjacent section, although theoretically they should not upset the balance of E. M. F.'s in the pilot circuit, yet in practice do so, for it is well known that it is impossible to get two transformers to balance accurately throughout a long range of load variation. The diverter relay F according to this invention is therefore introduced in order to render the relays C less sensitive when the straight-through current in the protected section, i. e. the conductor A, exceeds a predetermined amount. The diverter relay is energized directly from one current transformer and hence is subject to a much greater current than the relay C which is energized by unbalance or difference of current in the two current transformers. The diverter relay F operates by closing a circuit containing a resistance G, this circuit being in shunt across the relay operating coil C. Thus when such shunt circuit is closed the relay, although not cut out of operation, will be rendered less sensitive.

In Figure 2 the invention is shown as applied to two sections of a three-phase feeder. For the sake of simplicity in this figure and the following figures the trip circuits operating the switches or circuit breakers in the conductors are not shown. As in Figure 1 the sensitive or operating relay is indicated at C and is provided with a shunt circuit containing a resistance G, this shunt circuit being controlled by a diverter coil or relay F in circuit with the secondary D of a current transformer.

The diagram forming Figure 3 differs from Figure 2 only by the fact that the diverter coil or relay F acting in conjunction with the sensitive or operating relay C of one phase conductor $A^2$ is energized by the secondary winding $D'$ of another phase conductor $A^4$, the diverter relays of the phase conductors $A^3$ and $A^4$ being energized from the secondaries of current transformers in the other phases as shown. This method of tapping the diverter relay from adjacent phases may be adopted with advantage when for instance a power transformer intervenes between the protected sections.

Figure 4 illustrates the application of a diverter relay according to this invention for the protection of the three windings H, $H'$ and $H^2$ of a generator. The diagram shows the neutral point of the windings earthed and current transformers $D^2$ placed on each side of each winding. Each pair of secondaries is connected through a diverter coil or relay $F'$ which controls a shunt circuit containing a resistance $G'$, this shunt circuit being across the ends of the coils $C'$ of the operating or sensitive relay protecting each winding.

Figure 5 illustrates how the invention may be applied to a three-phase four-conductor system of a known type in which one phase is split into two parallel conductors $A^5$ $A^6$ which are connected to the opposed primaries of transformers J at each end of the line, the secondaries of these transformers energizing relays $C^2$ which control the tripping circuits. In this known arrangement two balancing transformers $J'$ are employed each having four windings connected in series respectively with each of the unsplit conductors $A^7$ and $A^8$ and the split conductors $A^5$ and $A^6$. The windings in series with $A^7$ and $A^8$ are opposed to each other as are also the windings in series with $A^5$ and $A^6$.

As shown in the diagram each of the relay coils $C^2$ has a shunt circuit including a resistance $G^2$, this shunt circuit being controlled by a diverter coil or relay $F^2$ energized by a secondary winding K on the adjacent transformer $J'$. This arrangement acts substantially in the manner before described to decrease the sensitiveness of the operating relays $C^2$ when by the occurrence of heavy straight-through currents in the section there would otherwise be a risk of the relays being operated unnecessarily.

What I claim as my invention and desire to secure by Letters Patent is:—

1. In a protective system for electric conductors wherein the operation of circuit breakers is brought about by means of relays controlling trip coils when the balance of current in a pilot circuit is disturbed, the combination with the relays and trip coils of means acting on the passage of a heavy straight-through current above a predetermined value to decrease the sensitiveness of the relays but at other times leaving such sensitiveness unimparied.

2. In a protective system for electric conductors the combination with the conductor to be protected of a circuit breaker at each end thereof, trip circuits for operating said circuit breakers, devices for closing said trip circuits said devices depending for their action on want of balance between the currents at each end of the protected conductor, and means for rendering the trip circuit closing devices less sensitive when a straight-through current above a predetermined value passes through the conductor, such means leaving the sensitiveness unimpaired at other times.

3. In a protective system for electric conductors the combination of a conductor, circuit breakers at each end of said conductor, a pilot circuit, protective devices in said pilot circuit controlling the circuit breakers, and means for decreasing the sensitiveness of said protective devices when a straight-through current above a predetermined value passes through the conductor, such sensitiveness being unimpaired at other times.

4. In a protective system for electric conductors the combination of a conductor, circuit breakers at each end of said conductor, sensitive relays controlling the trip circuits, and means for decreasing the sensitiveness of said relays when a straight-through current above a predetermined value passes through the conductor, such sensitiveness being unimpaired at other times.

5. In a protective system for electric conductors the combination of a conductor, circuit breakers at each end of said conductor, trip circuits controlling the circuit breakers, sensitive relays controlling the trip circuits, a shunt circuit across the coil of each sensitive relay, and means for closing such shunt circuits to decrease the sensitiveness when a straight-through current above a predetermined value passes through the conductor, such sensitiveness being unimpaired at other times.

6. In a protective system for electric conductors the combination of a plurality of conductors forming a three-phase feeder, circuit breakers at each end of each conductor, current transformers and sensitive relays opeating trip circuits controlling said circuit breakers, and means operated by the current transformers to render the relays less sensitive when a straight-through current above a predetermined value passes through the conductors, such sensitiveness being unimpaired at other times.

7. In a protective system for electric conductors the combination of a plurality of conductors forming a three-phase feeder, circuit breakers at each end of each conductor, current transformers and sensitive relays operating trip circuits controlling said circuit breakers, a shunt circuit across the coil of each sensitive relay, and means operated by the current transformers for closing said shunt circuits to reduce the sensitiveness when a straight-through current above a predetermined value passes through the conductors, such sensitiveness being unimpaired at other times.

8. In a protective system for electric conductors the combination of a plurality of conductors forming a three-phase feeder, circuit breakers at each end of each conductor, current transformers and sensitive relays operating trip circuits controlling said circuit breakers, a shunt circuit across the coil of each sensitive relay, and means operated by the current transformer of one phase conductor for closing the said shunt circuit of the sensitive relay of an adjacent phase conductor to decrease the sensitiveness when a straight-through current above a predetermined value passes through the conductors, such sensitiveness being unimpaired at other times.

9. In a protective system for electric conductors the combination with a three-phase four-conductor electric distribution system having one phase split into two parallel conductors with balancing transformers, trip circuits and relays arranged as set forth, of relays energized by secondary windings on the balancing transformers and acting to decrease the sensitiveness of the relays controlling the trip circuits when a straight-through current above a predetermined value passes through the conductors, such sensitiveness being unimpaired at other times substantially as set forth.

In testimony whereof I have signed my name to this specification.

REGINALD WILLIAM BILES.